(12) United States Patent
DeFrietas et al.

(10) Patent No.: US 9,103,731 B2
(45) Date of Patent: Aug. 11, 2015

(54) HIGH TEMPERATURE RESISTIVE TEMPERATURE DETECTOR FOR EXHAUST GAS TEMPERATURE MEASUREMENT

(75) Inventors: Dennis M. DeFrietas, Oxford, NY (US);
John Patrick Parsons, Afton, NY (US);
Denis O'Flynn, Wells Bridge, NY (US);
Jarodd Goedel, Sherburne, NY (US)

(73) Assignee: Unison Industries, LLC, Jacksonville, FL (US)

( * ) Notice: Subject to any disclaimer, the term of this patent is extended or adjusted under 35 U.S.C. 154(b) by 494 days.

(21) Appl. No.: 13/590,125

(22) Filed: Aug. 20, 2012

(65) Prior Publication Data

US 2014/0247106 A1    Sep. 4, 2014

(51) Int. Cl.
*H01C 3/04*   (2006.01)
*H01C 7/02*   (2006.01)
*G01K 7/18*   (2006.01)
*G01K 1/12*   (2006.01)
*G01K 13/02*  (2006.01)

(52) U.S. Cl.
CPC ........ *G01K 7/183* (2013.01); *G01K 1/12* (2013.01); *G01K 13/02* (2013.01); *G01K 2013/024* (2013.01)

(58) Field of Classification Search
CPC .... G01K 7/02; G01K 7/183; H01L 21/02068; H01L 21/2885; H01L 21/32115; H01L 21/3212; H01L 21/32134; H01L 21/7684; H01L 21/76847; H01L 21/76877; H01L 35/20; H01L 35/34
USPC ...................................... 338/25, 28
See application file for complete search history.

(56) References Cited

U.S. PATENT DOCUMENTS

| | | | |
|---|---|---|---|
| 2,780,703 A | * | 2/1957 | MacIntyre ............... 338/28 |
| 3,509,320 A | | 4/1970 | Werner et al. |
| 3,579,022 A | | 5/1971 | Hennig et al. |
| 3,607,447 A | | 9/1971 | Davis et al. |
| 3,665,766 A | | 5/1972 | Johnston |
| 3,725,837 A | | 4/1973 | Fullager |
| 3,761,857 A | * | 9/1973 | Carlson et al. ............ 338/30 |
| 3,798,760 A | | 3/1974 | Carlson et al. |
| 3,833,410 A | | 9/1974 | Ang et al. |
| 3,939,557 A | | 2/1976 | Rendle |
| 3,960,604 A | | 6/1976 | Heitzinger et al. |
| 4,321,827 A | | 3/1982 | Anderson |
| 4,406,154 A | * | 9/1983 | Zarchy .................. 73/31.07 |
| 4,808,009 A | | 2/1989 | Sittler et al. |
| 4,836,012 A | | 6/1989 | Doty et al. |
| 4,843,277 A | | 6/1989 | Winkler et al. |
| 4,906,965 A | * | 3/1990 | Murata et al. .............. 338/25 |

(Continued)

FOREIGN PATENT DOCUMENTS

EP    1571431    9/2005

OTHER PUBLICATIONS

US 6,391,663, 05/2002, Akram et al. (withdrawn)

*Primary Examiner* — Kyung Lee
(74) *Attorney, Agent, or Firm* — General Electric Company; William S. Munnerlyn (57) ABSTRACT

The present disclosure relates to a high temperature resistance temperature detector for measuring exhaust gas temperature for example. The structure includes a resistive element disposed on an insulated carrier. The structure further includes a housing disposed over the carrier and resistive element for inhibiting oxidation of the element which would result in failure of the detector.

35 Claims, 6 Drawing Sheets

(56) References Cited

U.S. PATENT DOCUMENTS

| | | | | |
|---|---|---|---|---|
| 4,916,715 A | | 4/1990 | Adiutori | |
| 4,929,092 A | * | 5/1990 | Taguchi et al. | 374/183 |
| 5,369,993 A | | 12/1994 | Hagan | |
| 5,520,461 A | | 5/1996 | Curry et al. | |
| 5,653,538 A | | 8/1997 | Phillips | |
| 5,708,326 A | | 1/1998 | Mizohata et al. | |
| 5,731,507 A | | 3/1998 | Hagen et al. | |
| 5,772,325 A | | 6/1998 | Hopson et al. | |
| 5,864,282 A | | 1/1999 | Hannigan et al. | |
| 5,999,081 A | | 12/1999 | Hannigan et al. | |
| 6,040,519 A | | 3/2000 | Kita et al. | |
| 6,071,556 A | | 6/2000 | Beele | |
| 6,081,182 A | * | 6/2000 | Tomozawa et al. | 338/25 |
| 6,127,915 A | * | 10/2000 | Gam et al. | 338/28 |
| 6,151,771 A | | 11/2000 | Tzeng et al. | |
| 6,162,552 A | | 12/2000 | Bewlay et al. | |
| 6,190,038 B1 | | 2/2001 | Kita et al. | |
| 6,203,752 B1 | | 3/2001 | Bewlay et al. | |
| 6,280,083 B2 | | 8/2001 | Kita et al. | |
| 6,354,736 B1 | | 3/2002 | Cole et al. | |
| 6,472,240 B2 | | 10/2002 | Akram et al. | |
| 6,597,107 B1 | | 7/2003 | Meszaros et al. | |
| 6,607,302 B2 | | 8/2003 | Lyle | |
| 6,609,825 B2 | | 8/2003 | Ice et al. | |
| 6,624,577 B2 | | 9/2003 | Meszaros et al. | |
| 6,632,018 B2 | | 10/2003 | Isshiki et al. | |
| 6,709,878 B2 | | 3/2004 | Akram et al. | |
| 6,744,346 B1 | | 6/2004 | Akram et al. | |
| 6,881,932 B2 | | 4/2005 | Giterman | |
| 7,004,626 B1 | | 2/2006 | Giberson et al. | |
| 7,026,908 B2 | | 4/2006 | Habboosh | |
| 7,026,909 B2 | | 4/2006 | Glozman et al. | |
| 7,031,871 B2 | | 4/2006 | Severson et al. | |
| 7,061,364 B2 | | 6/2006 | Habboosh | |
| 7,102,534 B2 | | 9/2006 | Ha | |
| 7,104,685 B2 | | 9/2006 | Hanzawa et al. | |
| 7,611,280 B2 | | 11/2009 | Habboosh | |
| 8,201,992 B2 | * | 6/2012 | Horovitz et al. | 374/29 |
| 2002/0145373 A1 | | 10/2002 | Meszaros et al. | |
| 2003/0005779 A1 | | 1/2003 | Bernard | |
| 2003/0058919 A1 | | 3/2003 | Ice et al. | |
| 2003/0132707 A1 | | 7/2003 | Meszaros et al. | |
| 2003/0207151 A1 | | 11/2003 | Stamm | |
| 2004/0070487 A1 | | 4/2004 | Zitzmann | |
| 2004/0086730 A1 | | 5/2004 | Shipton et al. | |
| 2005/0064229 A1 | | 3/2005 | Stamm | |
| 2005/0104713 A1 | | 5/2005 | Habboosh | |
| 2005/0115329 A1 | * | 6/2005 | Gregory et al. | 73/777 |
| 2005/0124154 A1 | | 6/2005 | Park et al. | |
| 2005/0129565 A1 | | 6/2005 | Ohriner et al. | |
| 2006/0202792 A1 | | 9/2006 | Habboosh | |
| 2006/0219330 A1 | | 10/2006 | Hu et al. | |
| 2009/0066472 A1 | * | 3/2009 | Kondo | 338/34 |

\* cited by examiner

HIGH TEMPERATURE RESISTIVE TEMPERATURE DETECTOR FOR EXHAUST GAS TEMPERATURE MEASUREMENT

BACKGROUND

Present embodiments relate generally to gas turbine engines. More particularly, but not by way of limitation, present embodiments relate to resistive temperature detectors for exhaust gas temperature measurement in a gas turbine engine.

In turbine engines, air is pressurized in a compressor and mixed with fuel in a combustor for generating hot combustion gas which flow downstream through turbine stages. These turbine stages extract energy from the combustion gas. A high pressure turbine includes a first stage nozzle and a rotor assembly including a disk and a plurality of turbine blades. The turbine engine may include a number of stages of static airfoils, commonly referred to as vanes, interspaced in the engine axial direction between rotating airfoils commonly referred to as blades. The high pressure turbine first receives the hot combustion gas from the combustor and includes a first stage stator nozzle that directs the combustion gas downstream through a row of high pressure turbine rotor blades extending radially outwardly from a first rotor disk. In a two stage turbine for example, a second stage stator nozzle is positioned downstream of the first stage blades followed in turn by a row of second stage turbine blades extending radially outwardly from a second rotor disk. The stator nozzles direct the hot combustion gas in a manner to maximize extraction at the adjacent downstream turbine blades.

The first and second rotor disks are joined to the high pressure compressor by a corresponding rotor shaft for powering the compressor during operation. A multi-stage low pressure turbine follows the two stage high pressure turbine and is typically joined by a second shaft to a fan or low pressure compressor disposed upstream from the high pressure compressor in a typical turbofan aircraft engine configuration for powering an aircraft in flight.

As the combustion gas flows downstream through the turbine stages, energy is extracted therefrom and the pressure of the combustion gas is reduced. The combustion gas is used to power the compressors as well as a turbine output shaft for power and marine use or provide thrust in aviation usage. In this way, fuel energy is converted to mechanical energy of the rotating shaft to power the compressor and supply compressed air needed to continue the process.

During the operation of the gas turbine engine, it is necessary to obtain temperature readings at different locations in the engine. This data is utilized by the engine control logic to properly operate the engine and provide maximum performance at the highest efficiency. One such temperature probe which is utilized at the exhaust area of the combustor, it is known as an Exhaust Gas Temperature probe or EGT probe or sensor. These probes utilize type-K thermocouples typically having dissimilar metals to create a differential which may be then input to the engine control logic to optimize performance.

Resistance temperature detectors (RTD) are also utilized in probe assemblies to measure operating temperatures. RTDs utilize variable resistant material at a position where a temperature is to be measured with leads connected to an instrument which measures an amount of varying voltage when power is supplied to a sensor. Since resistance changes with temperature, the temperature may be determined by applying a constant current to the resistor and measuring the voltage drop to determine the resistance and resultant temperature.

Various metals may be used which provide differing resistances upon exposure to heat. One problem with use at high operating temperatures is that materials suffer from oxidation, ionic migration wire alpha shifts and weakened strength. This can result in decreased life as well as temperature measurement drift. For operation in high temperature environments, typically at or above 1832 degrees Fahrenheit, operating conditions are limited to specialized RTD constructions using platinum, wire wound or thin film constructions. However, even these constructions are still limited generally for short durations of temperature exposure above 1832 degrees Fahrenheit which severely limits applicability in various industries.

Current designs cannot withstand temperatures at the combustor exit or high pressure turbine entrance for extended periods of time. Accordingly, temperatures must be taken near the low pressure turbine and extrapolated to a position at the combustor exit. This however can lead to error. Additional problems occur such as decreases in engine management efficiency due to the extrapolation, as opposed to obtaining an actual reading. Moreover, time delays in optimization of engine conditions may further result in less than maximum engine performance when engine operating conditions change, for example ambient air temperature changes. For these reasons, a compromise is struck between positioning too close to the combustor, which may result in early failure of the detector, and placing further from the combustor which may result in less accurate temperature readings at the combustor exit.

As may be seen from the foregoing, there is a need to optimize the engine management by providing a temperature reading closer to the combustor. There is a further need to optimize temperature detectors so that the temperature detector can withstand temperatures typically occurring at the combustor and high pressure turbine and inhibiting degradation, drift and failure at high temperatures for extended periods of time.

SUMMARY

Some embodiments of the present disclosure relate to a high temperature resistance temperature detector for exhaust gas temperature measurement in, for example, a gas turbine.

According to some embodiments, a high temperature resistance temperature detector is provided which utilizes an insulating carrier and a resistive element. The RTD further comprises leads formed of grain stabilized platinum. The detector will provide for usage at higher temperature for longer steady state conditions and limit external electromagnetic interference noise.

All of the above outlined features are to be understood as exemplary only and many more features and objectives of the method may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of this disclosure, and the manner of attaining them, will become more apparent and the resistance temperature detector will be better understood by reference to the following description of embodiments taken in conjunction with the accompanying drawings, wherein.

DETAILED DESCRIPTION

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Present embodiments provide structure for detecting high temperatures of gas flow within a gas turbine engine. The high temperature (RTD) utilizes an insulating material and a resistive material disposed on or about the resistive material. Leads extend from the insulating material and detector element is positioned within a housing.

The terms fore and aft are used with respect to the engine axis and generally mean toward the front of the turbine engine or the rear of the turbine engine in the direction of the engine axis, respectively. As used herein, the term "software" and "firmware" are interchangeable including any computer programs stored in memory for execution by processor, including RAM memory, ROM memory, EPROM memory, EEPROM memory and non-volatile RAM (NVRAM) memory. The memory types are exemplary only and thus are not limiting as to the types of memory useful for storage in the computer program. As will be appreciated on the foregoing specification, the above described embodiments of the disclosure may be implemented using computer programming or engineering techniques including computer software, phoneware, hardware, or any combination of subset thereof, wherein the technical effect is for sensing a process parameter using a process sensor where slow response time may introduce errors into the value of the sensing parameter in input to the processor or control logic for the avionics system. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed "hard" drive diskette, optical disk, magnetic tape, semiconductor memory such as read-only memory (ROM) and that and/or any transmitting/receiving media such as the Internet or other communication network. The article of manufacture contains a computer code. The computer code may be made and/or used by executing the code directly from one medium, by copying the code from one medium to another medium or by transmitting the code of the network.

Referring now to FIGS. 1-11, various embodiments of a high temperature resistance temperature detector are shown. The resistance temperature detector is capable of operating in higher temperatures enabling closer positioning of the RTD toward the combustor exit. This will improve reactance of, and reduce errors, in computer control logic which may occur due to rapid changes in temperature or other characteristics. Engine control logic may be represented in various forms. For purpose of this disclosure, the control logic may be operated by a processor which operates software or firmware, for example. The term processor, is used herein, refers to central processing units, microprocessors, microcontrollers, reduced instruction set circuits (RISC), application specific integrated circuits (ASIC), logic circuits, and any other circuit or processor capable of executing the functions described herein.

Figure 1:
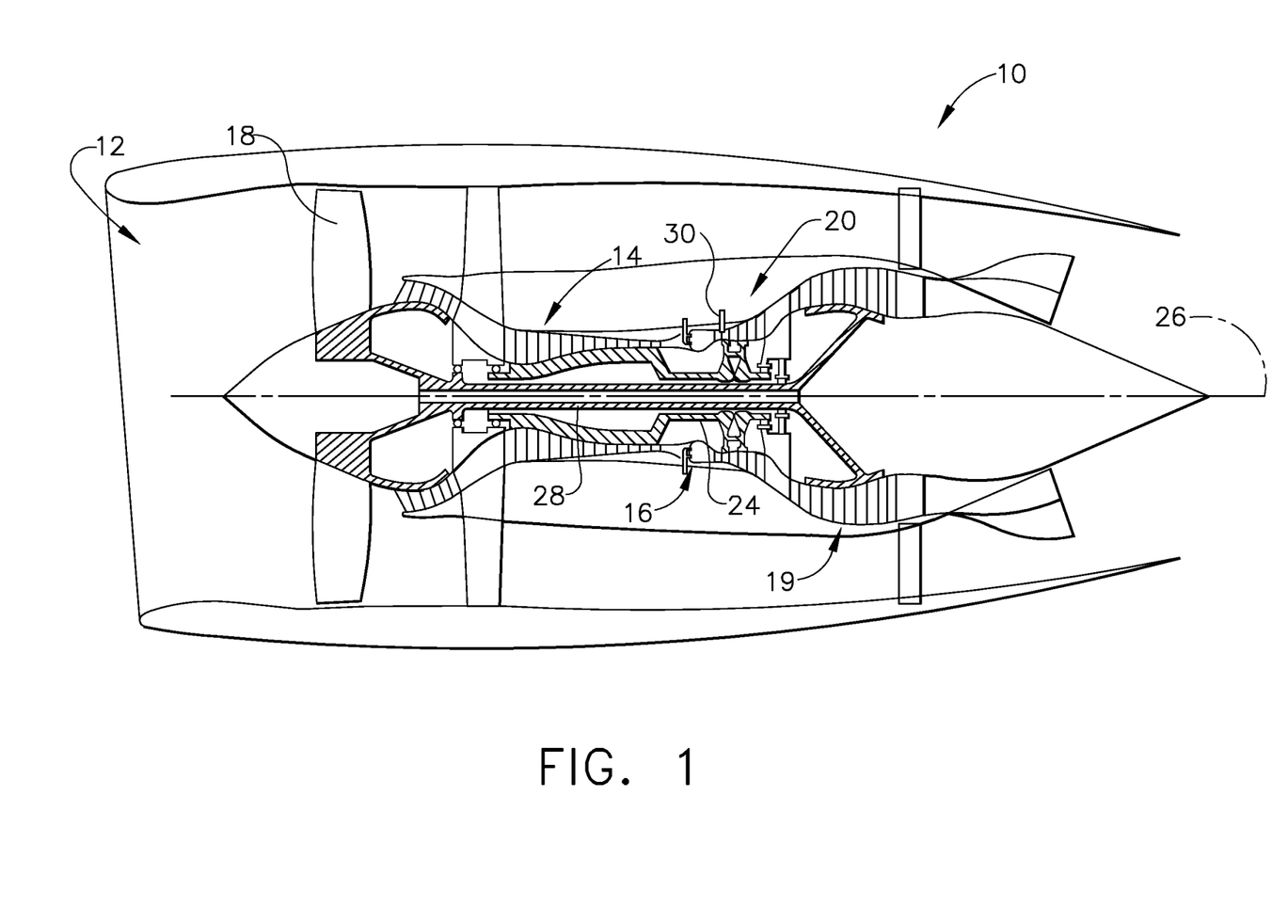
FIG. 1 is a side section schematic view of an exemplary turbine engine.

Referring initially to FIG. 1, a schematic side section view of a gas turbine engine 10 is shown having an engine inlet end 12, a compressor 14, a combustor 16 and a multi-stage high pressure turbine 20. The gas turbine 10 may be used for aviation, power generation, industrial, marine or the like. Depending on the usage, the engine inlet end 12 may alternatively contain multi-stage compressors rather than a fan. The gas turbine 10 is axi-symmetrical about engine axis 26 or shaft 24 so that various engine components rotate thereabout. In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design.

The axis-symmetrical shaft 24 extends through the turbine engine 10, from the forward end to an aft end. The shaft 24 is supported by bearings along its length. The shaft 24 may be hollow to allow rotation of a low pressure turbine shaft 28 therein. Both shafts 24, 28 may rotate about a centerline 26 of the engine. During operation the shafts 24, 28 rotate along with other structures connected to the shafts such as the rotor assemblies of the turbine 20 and compressor 14 in order to create power or thrust depending on the area of use, for example power, industrial or aviation.

Referring still to FIG. 1, the inlet 12 includes a turbofan 18 which has a plurality of blades. The turbofan 18 is connected by shaft 28 to the low pressure turbine 19 and creates thrust for the turbine engine 10. Aft of the combustor 16 is one exemplary location for a temperature detector 30. Although an exhaust gas temperature is discussed herein, sensors of the instant disclosure may be utilized at various locations such as the compressor 14 turbines 20, 19 and other locations.

Figure 2:
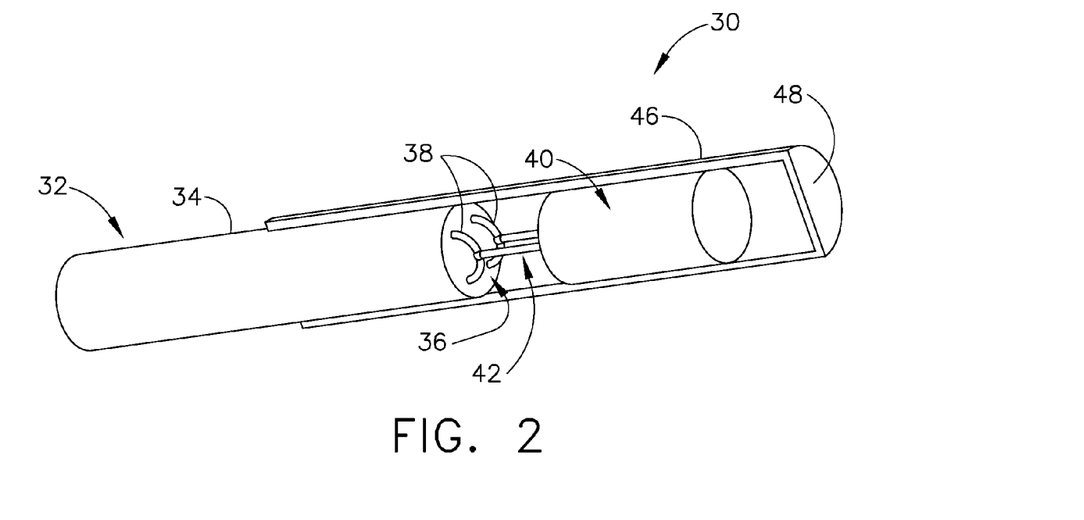
FIG. 2 is perspective view of a resistance temperature detector assembly.

Referring now to FIG. 2, a resistance temperature detector 30 is depicted in perspective view. The detector has a high temperature operational capability with a generally linear and stable resistance versus temperature characteristic. The assembly includes a cable 32. The outer portion of the cable 32 may have a sheath 34 formed of for example, HA 230 or Platinum or Platinum alloy, for example Platinum 10% Rhodium or Platinum 20% Rhodium, and which surrounds an insulation 36. The insulation 36 may be formed of crushed or powder form magnesium oxide or aluminum oxide, for example although other materials may be utilized. Additionally, the sheath 34 may be oxide dispersion strengthened or grain-stabilized alloys to reduce grain growth at elevated temperatures. The sheath 34 has the additional function of limiting electromagnetic interference noise.

Extending through the cable 32 are wires 38, which are exposed at an end of the cable 32. The wires 38 extend from the insulation 36 and provide an interconnect for a junction with leads 42 which connect to a resistance temperature detector element 40. The cable 32 may have multiple wires 38 within the insulation 36. In the depicted example, the cable 32 includes four wires, wherein pairs of the wires 38 are joined to form two U-shaped conductors. The number of wires provided within the cable 32 will be dependent upon the circuit being formed and may vary. The wires 38 may be formed of grain stabilized platinum or zirconia grain stabilized platinum, for example in order to limit joining of grain at elevated temperature. It is desirable that the detector element 40 fail prior to failure of the cable 32 to preclude foreign object damage within the engine core.

Figure 3:
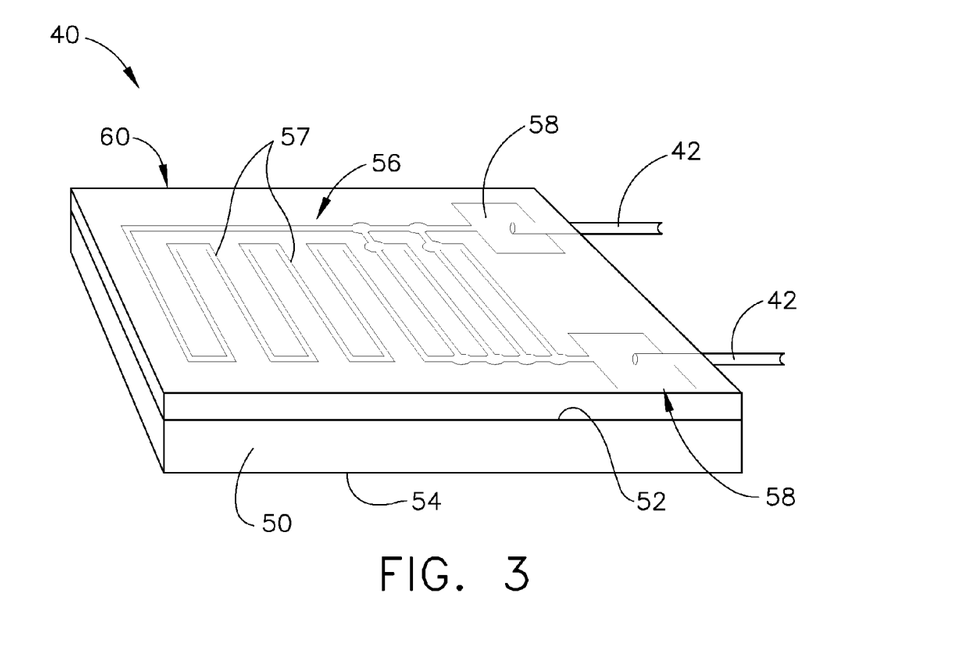
FIG. 3 is an isometric view of a first embodiment of a resistance temperature detector element.

Extending from the wires 38 and in conductive communication therewith are first and second leads 42. The leads 42 provide a circuit connection with the wires 38 and extend an opposite end to the remaining portion of the resistance temperature detector element 40. According to one exemplary embodiment two leads 42 are utilized in the depicted construction. However this is merely exemplary as alternate constructions may be utilized. The leads 42 may be formed of grain stabilized or zirconia grain stabilized platinum. Similarly, the wire 38 are a grain stabilized wire or zirconia grain stabilized platinum as well. Grain growth within the structure is the process by which these grains effectively combine and hence grow in size during exposure to elevated temperatures. This may result in various problems and therefore grain stabilized wire would be desirable. Similar material is utilized in the wire 38 in the leads 42 in order to limit problems with dissimilar metals and differential thermal expansion and contraction. However, these materials are exemplary and one skilled in the art should recognize that alternate embodiments are within the scope of the present disclosure. According to one embodiment, the leads 42 may have a diameter of 0.010 inch but may be within the range of between about 0.003 and about 0.03 inch and more preferably about 0.0007 inch to about 0.015 inch. As shown in FIG. 3, the construction utilizes two 3-wire connections extending toward an RTD element 40 forming a 4-wire measurement circuit. The use of 4-wire measurement circuit aids in the elimination of temperature error measurement associated with the series resistance presented by the lead wires 38.

The resistance temperature detector element 40 may take various forms to be discussed further herein. The element 40 may have an insulated portion, substrate or carrier 50 and a resistive element 56 utilize therein and wherein the resistive element is in electric communication with the leads 42. A housing or seal element 46 may be positioned over the element 40 and additionally covering the connection between the leads 42 and the wires 38. The housing 46 may be formed of HA 230, platinum or Platinum alloys such as Platinum 20% Rhodium and may be a single piece construction or may be formed a tube 46 with an end cap 48 which are joined together. The housing 46 may be metallic, a glazed ceramic or may be glass-based and may be welded or otherwise joined to the cable 32. One exemplary embodiment utilizes a hermetic compression glass seal at the transition of the lead wire from the hard lead wires 38. The coefficients of thermal expansion of all materials must be closely matched for device longevity at elevated temperatures. Tungsten sealing glasses may be used to encase the elements. The interior of the housing 46 may include a powder filled alumina or hafnium for purpose of insulation according to some embodiments. According to other embodiments, the interior may be a hermetic environment, may be evacuated and/or or may be filled with an inert gas, such as for example high purity Argon or Nitrogen. Other gasses may be utilized. According to some embodiments, the housing 46 may be powder filled and evacuated then back-filled with an inert non-oxygen atmosphere and hermetically sealed all of which surround the element in a mechanically supported non-oxidizing atmosphere.

For normal operation, it would be desirable for the RTD 30 to operate properly within the following ranges. The operating temperature range of about 1500 to about 3000 degrees Fahrenheit and more particularly about 1850 to about 2201 degrees Fahrenheit. The element resistance should be about 12 ohms at 32 degrees Fahrenheit with a resistance dynamic range of 5 Ohms to about 40 Ohms. The sensor 30 should be accurate to greater of +/−0.4% of point or about +/−8 degrees Fahrenheit. The excitation current (nominal) may be desirably be about 100 ma and (fault) at about 300 ma. This represents one embodiment of element parameter but should not be considered limiting as other parameters may be utilized.

Referring now to FIG. 3, a first embodiment of resistive temperature detector element 40 is shown. The structure includes an insulating substrate 50 having a first surface 52 in a second surface 54. One of the surfaces includes a resistive element 56. The resistive element 56 may be formed of various materials which are temperature resistant and may be oxide disposerd or grain stabilized. For example, one material may be a tungsten and rhenium wherein the tungsten is between about 70-98% and the rhenium is between about 2-30%, for example Tungsten 25% Rhenium alloy. The resistive elements of all of the embodiments may utilize materials in this range as this composition of tungsten and rhenium have been found to be able to withstand the temperatures in the range associated with high temperature combustion of a gas turbine engine 10. As compared to various alloys such as Rhenium, molybdenum 50% Rhenium, Molybdenum, tungsten or tantalum, tungsten 25% Rhenium appears to have the most linear temperature to resistance profile between 0 and about 3000 degrees Fahrenheit.

According to the exemplary embodiment, the resistive element 56 includes a network of series and parallel circuit paths 57 which define a "thin-film" resistive device. Once formed, the resistive element 56 may be tuned to a desired resistivity by trimming or cutting the paths 57 to a circuit which provides the desired resistance. The thin-film circuit further comprises circuit pads 58 on the insulating substrate 50 and which are in conductive communication with lead wire 42. Extending from the pads 58 by, for example, weld or brazed connection are the leads 42 which extend to the wires 38 of the cable 32 (FIG. 2) for conductive communication. Disposed above the surface 52 having the resistive element 56 is a sealing and insulating layer 60. This sealing and insulating layer 60 may be one of glass or ceramic, for example. However, other materials may be utilized. Tungsten materials should not be exposed to elevated temperatures while in contact with oxygen or else oxidation will occur resulting in failure of the tungsten material.

One skilled in the art should also recognize that although the insulating substrate 50 is shown to be formed in a rectangle shape, other geometric shapes such circular, oval, or polygonal shapes may be utilized rather than the rectangular shape of the exemplary depiction. Additionally, one skilled in the art should realize that while a single layer is shown for the RTD element 40, it is within the scope of this disclosure that multiple substrates 50 and resistive elements may be insulated from one another so as to allow stacking or laminating multiple of these circuits.

Figure 4:
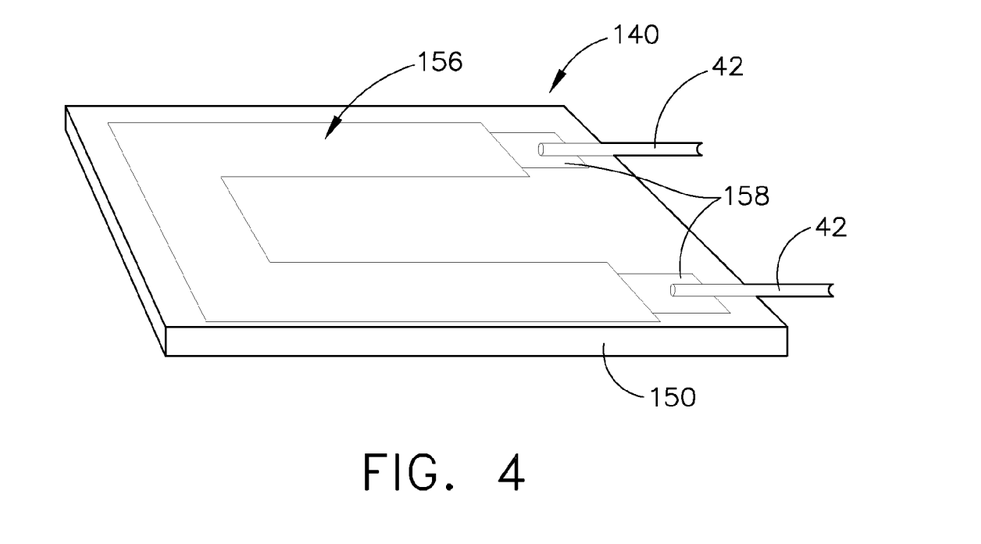
FIG. 4 is an isometric view of a second embodiment of a resistance temperature detector element.

Referring now too FIG. 4, a second embodiment of a resistance temperature detector element 140 is shown. As opposed to the embodiment of FIG. 3 which was a thin film device, the embodiment of FIG. 4 is a thick film device. The embodiment includes an insulating substrate 150 upon which a resistive element 156 is deposited. This may be done, for example by laser vapor deposition or sintering. The resistive element 156 may be formed of the tungsten-rhenium combination previously discussed. The resistive element 156 is different from the network of paths previously described in that the element 156 is generally a thick film of a preselected area of resistive material. Like the paths 57 of the resistive element 56, the film 156 may be ablaited, laser trimmed or cut in order to tune or calibrate the resistivity to a desired amount. The embodiment also comprises circuit pads 158 for lead wire attachment. The leads 42 are then connected to the pads 158 in order to form a circuit between the leads 42, the pads 158 and the resistive element 156. Lead wires may be welded or brazed to the circuit pads 158. Similarly to the previous embodiment, the element 140 may also have a top seal or insulation layer 160.

Figure 5:
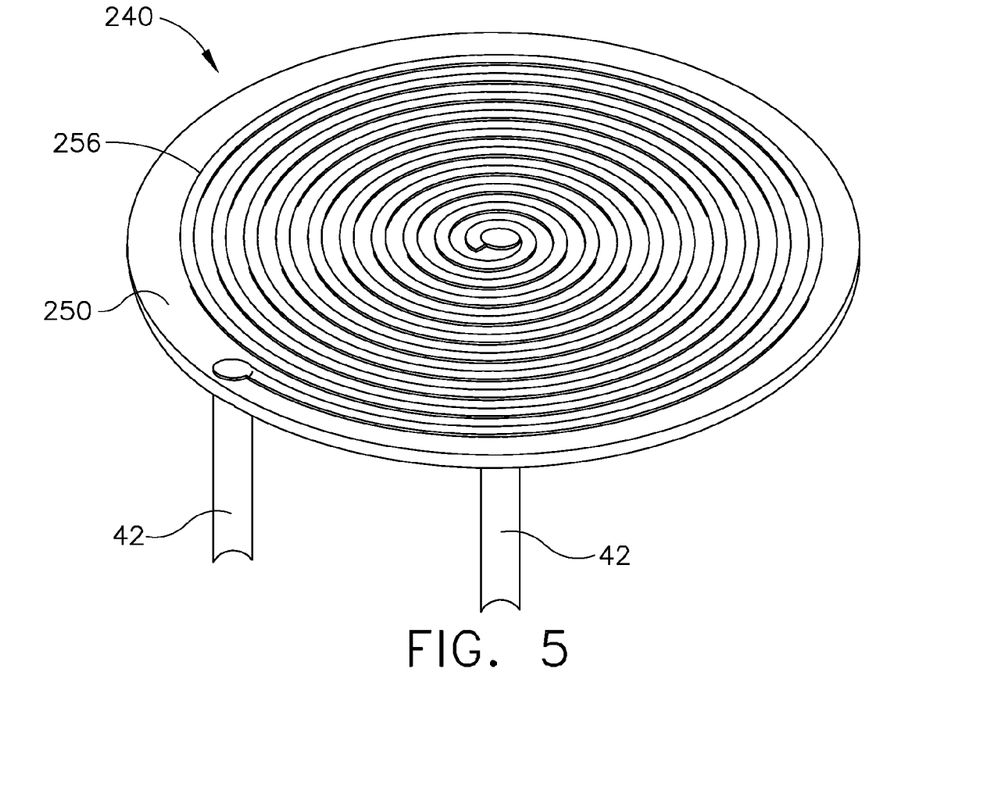
FIG. 5 is an isometric view of a third embodiment of a resistance temperature detector element.

Referring now to FIG. 5, and third embodiment of a resistance temperature detector element 240 is depicted. The element 240 includes insulating substrate 250. In the exemplary embodiment, the substrate 250 is a circular or disk shaped wafer as opposed to the rectangular shape previously shown and described. Again alternate shapes may be utilized. A resistive element 256 is depicted on one of the surfaces of the insulating layer 250. The resistance circuit 256 is formed in a spiral shape according to the exemplary embodiment. The resistive element 256 has a first end and a second end which are in electric communication with leads 42 extending from an opposite surface of the insulating layer 250. In the exemplary embodiment one lead 42 extends to near a bottom center of the insulating layer 250 while a second lead 42 extends to near an edge of the insulating layer for electric communication with the ends of the circuits 256.

Figure 6:
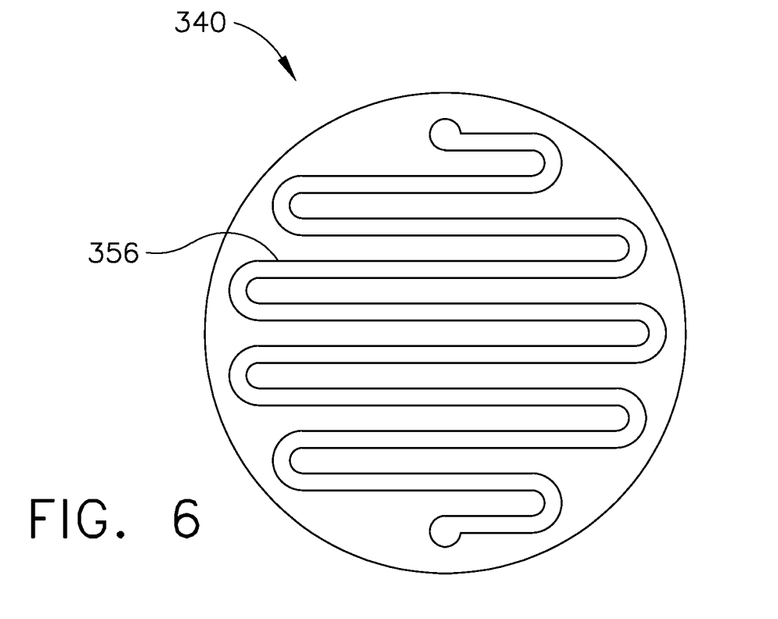
FIG. 6 is a top view of a fourth embodiment of a resistance temperature detector element.

Referring now to FIG. 6-9, alternate patterns for the resistive element are depicted for use with the insulating layers. With reference first to FIG. 6, the RTD element 340 is shown with a curvilinear resistance element 356. The ends of the resistive element 356 may be disposed at various locations on the disk 350 for electric connection with the leads 42 (not shown).

Figure 7:
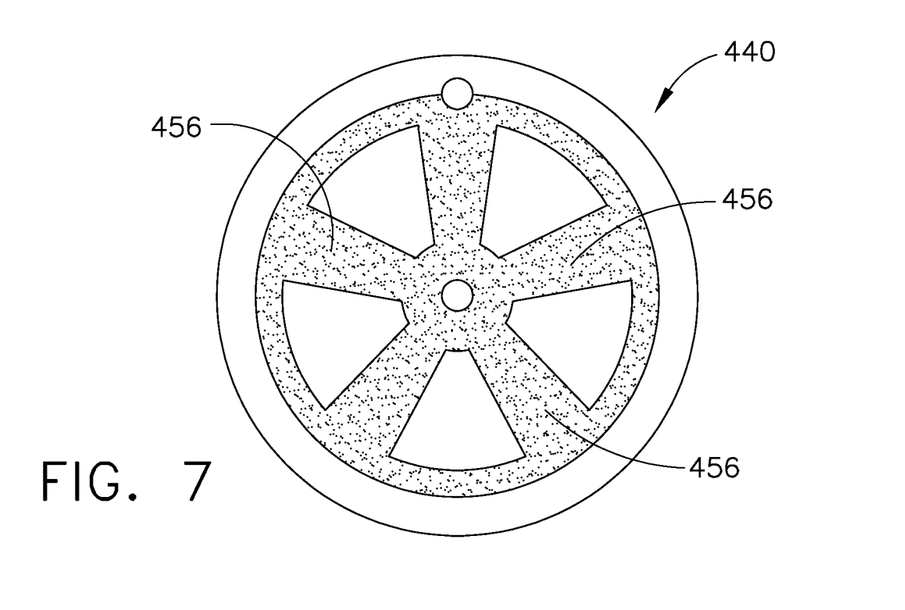
FIG. 7 is a top view of a fifth embodiment of a resistance temperature detector element.

Referring to FIG. 7, a top view is shown. The resistive element 440 is circular and generally includes a plurality of spokes 456 which are like a thick film design. The center of the resistive element 440 includes a center electrode and a second electrode is disposed along the edge.

Figure 8:
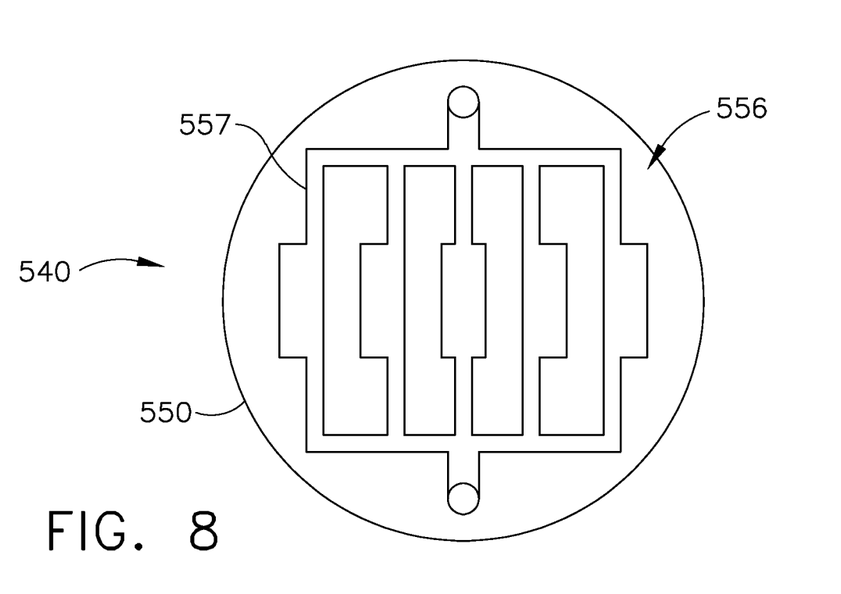
FIG. 8 is a top view of a sixth embodiment of a resistance temperature detector element.

Referring to FIG. 8, a further alternative RTD element 540 is depicted. Again this embodiment is shown in the context of use with a disk shaped insulating layer 550 however alternate shapes may be utilized. The resistive element 556 includes a network of serial and parallel paths 557.

Figure 9:
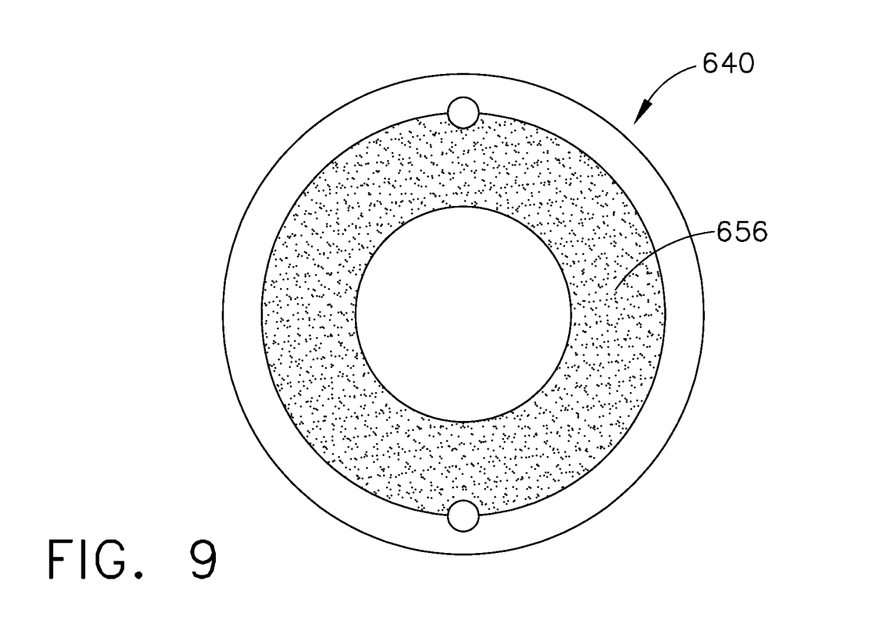
FIG. 9 is a top view of a seventh embodiment of a resistance temperature detector element.

Referring to FIG. 9, also is a top view of a resistive temperature detector 640 having a thick film circuit. According to this embodiment, the resistive element 656 utilizes a deposited ring shaped on the insulated carrier 650. Electrodes are located along edges of the circuit to electrically communicate with the current source. The ring or washer shape may be ablaited, blasted or cut to form a desirable resistivity as previously described.

Like the embodiment discussed with FIG. 3, the embodiments shown in FIGS. 4-9 may be stacked in a laminate or sandwiched construction.

Figure 10:
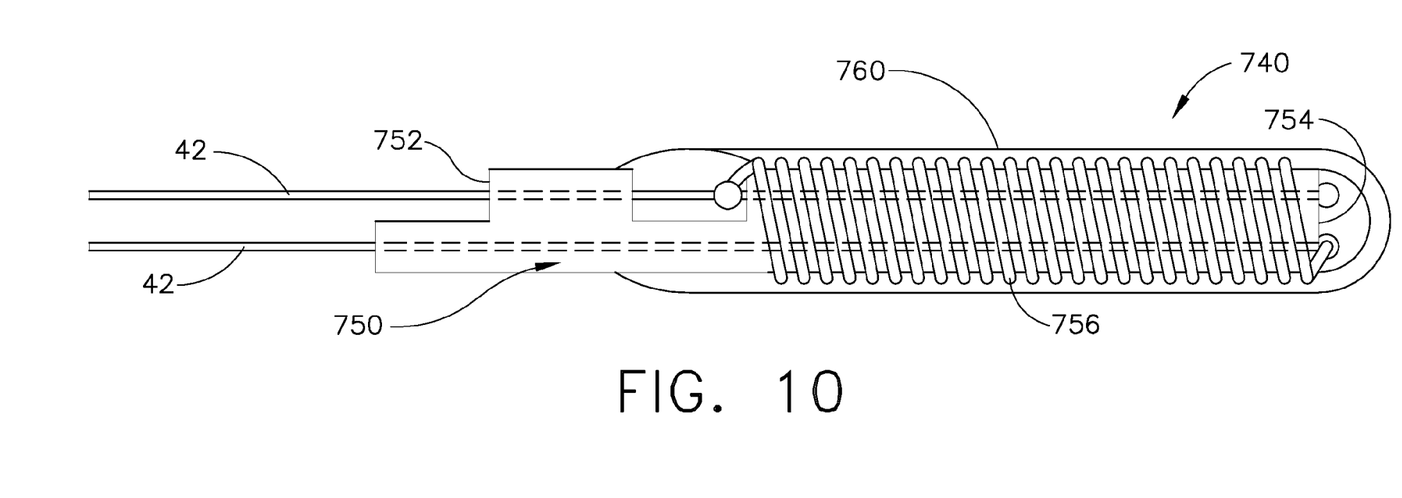
FIG. 10 is another embodiment of a resistance temperature detector element with an alternative design.

Referring to FIG. 10 a further alternative resistive temperature detector element 740 is depicted in side view. And insulating material 750 is shown in the form of cylindrical mandrel. The material 750 has a first end 752 and a second distal end 754. At the first end 752, lead wires 42 extend into the insulating material 750 through bore or through-holes depicted in broken line. A resistive element 756 is wrapped around the mandrel 750 between the first end 752 seconds end 754. The resistive element 756 has a first end which is welded or brazed to one of the leads 42 and a second end which is welded or brazed to the second lead 42. The resistive element 756 may be in the form of a fine element wire, a thin film or a thick film structure as previously described. A glass or ceramic outer insulating coating or housing 760 may be disposed around the material 750 to seal the structure therein. The interior of the coating or housing 760 may include an inert gas or may be some other hermetically sealed non-oxidizing environment. Further, strain relief potted material may be located at ends of the mandrel 750 or along the path of the resistive elements and 756. Again, as one skilled in the art will understand, tungsten material may not be in contact with an oxidizing atmosphere at elevated temperatures. It is desirable that conformal hermetic coatings or hermetic non-oxidizing atmospheric vessel may be utilized.

Figure 11:
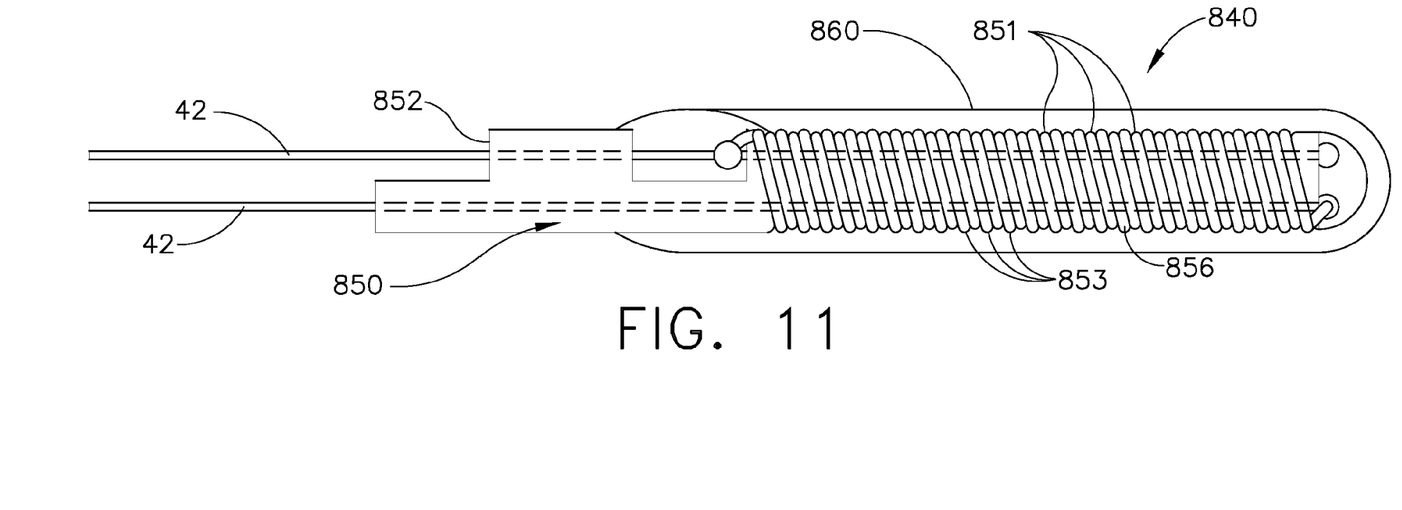
FIG. 11 is an additional alternative embodiment of the resistance temperature detector element of FIG. 10.

Referring now to FIG. 11, a further alternative embodiment to that shown in FIG. 10 is depicted in side view. The resistive element 840 includes a mandrel 850 which includes an outer surface which is serrated or curvilinear sidewall defined by plurality peaks 851 and valleys 853. The valleys 853 provide a position where in the resistive element 856 may be seated and come to a neutral position. Thus the valleys 853 function as a wire retaining feature. The leads 42 enter the insulating mandrel 850 near a first end 852 and connect with ends of the resistive element 856 to form a circuit. A housing 860 covers the structure to provide an anti-oxidizing environment through any of the various methods previously provided. The housing 860 may be sealed against the insulating material 850 or against the cable sheath 34 (FIG. 2).

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Furthermore, references to one embodiment are not intended to be interpreted as excluding the existence of additional embodiments that may also incorporate the recited feature.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What we claim is:

1. A resistive temperature detector, comprising:
   an insulating carrier being one of a generally cylindrical mandrel;
   a resistive element one of deposited on or wrapped about said insulating carrier, said resistive element being formed of a first portion of tungsten and a second portion formed of rhenium;
   said insulating carrier and said resistive element capable of being positioned in a high temperature gas flow having a temperature range between about 1500 degrees and 3000 degrees Fahrenheit;
   leads extending from said insulating carrier and in electrical communication with said resistive element, said leads and at least one interconnect wire being formed of grain stabilized platinum; and
   a housing disposed over said insulating carrier and said resistive element providing an oxygen-free environment.

2. The resistive temperature detector of claim 1, said tungsten being between about 85-98%.

3. The resistive temperature element of claim 1, said rhenium being between about 2% and 15%.

4. The resistive temperature detector of claim 1 wherein said insulating carrier is a ceramic.

5. The resistive temperature detector of claim 1, said mandrel having through holes receiving said leads.

6. The resistive temperature detector of claim 1 wherein said resistive element is a wire wrapped about said mandrel.

7. The resistive temperature detector of claim 1 wherein said leads are a zirconia grain stabilized platinum.

8. The resistive temperature detector of claim 1 wherein said resistive element is one of a thin film or a thick film.

9. The resistive temperature detector of claim 1, said housing being metallic.

10. The resistive temperature detector of claim 1 further wherein said housing is a hermetic housing packed with a powder.

11. A resistive temperature detector, comprising:
    an insulating carrier being in the form of a mandrel;
    a resistive element being one of sintered, deposited on or wrapped about said insulating carrier, said resistive element being a tungsten-rhenium material;
    a seal element covering said insulating carrier and said resistive element;
    grain stabilized platinum leads extending from said insulating carrier and in communication with said resistive element;
    said grain stabilized platinum leads further in communication with grain stabilized platinum interconnect wires;
    a housing disposed over said insulating carrier and said resistive element and forming an oxygen-free environment.

12. The resistive temperature detector of claim 11 said seal element being glass.

13. The resistive temperature detector of claim 12, an interior of said glass being a hermetic environment.

14. The resistive temperature detector of claim 11, said seal element being glazed ceramic.

15. The resistive temperature detector of claim 11, said seal element filled with an inert gas.

16. The resistive temperature detector of claim 11 wherein said inert gas is one of nitrogen or argon.

17. The resistive temperature detector of claim 11 wherein a first end of said resistive element and a second end of said resistive element are fixed.

18. The resistive temperature detector of claim 11 wherein said mandrel has tapered slots for positioning said resistive element.

19. The resistive temperature detector of claim 11, said resistive element being a wire having a diameter of between about 0.007 inch and 0.030 inch.

20. The resistive temperature detector of claim 11 wherein said detector comprises a thin film resistive element.

21. The resistive temperature detector of claim 11 wherein said detector comprises a thick film resistive element.

22. The resistive temperature detector of claim 11 further comprising a curvilinear resistive element.

23. The resistive temperature detector of claim 11 wherein said resistive element is spiral shaped.

24. The resistive temperature detector of claim 11, said resistive element being circular with a plurality of spokes.

25. The resistive temperature detector of claim 11, said resistive element being ring shaped.

26. A resistance temperature detector comprising:
    an insulated mandrel having a generally cylindrical shape;
    said mandrel having a first end and a second end, first and second leads extending into one of said first end and said second end and forming a circuit with a resistive element formed of tungsten rhenium alloy;

said resistive element disposed about said mandrel such that said first lead connects to one end of said resistive element and said second lead connects to a second end of said resistive element, said first and second leads being formed of grain stabilized platinum;

a housing disposed over at least a portion of said mandrel and resistive element inhibiting oxidizing of said resistive element.

27. The resistance temperature detector of claim 26, said mandrel having an outer surface with a plurality of peaks and valleys.

28. The resistance temperature detector of claim 26, said resistive element wrapped about said mandrel and disposed within said valleys so as to retain said resistive element in position.

29. The resistance temperature detector of claim 26, said resistive element being deposited on said mandrel.

30. The resistance temperature detector of claim 26, said resistive element comprising a tungsten 25% rhenium.

31. The resistance temperature detector of claim 26, said mandrel comprising bores for receiving said first lead and said second lead.

32. The resistance temperature detector of claim 26 further comprising a welded or brazed connection between said leads and said resistive element.

33. A resistance temperature detector, comprising:
an insulated mandrel of preselected shape;
a resistive element extending about said insulated mandrel, said resistive element formed of a tungsten rhenium alloy;
a first lead and a second lead extending to said mandrel and in communication with said resistive element;
said first lead in electrical communication with a first contact of said resistive element and said second lead in electrical communication with a second contact of said resistive element;
said first and second leads formed of grain stabilized platinum.

34. The resistance temperature detector of claim 33 wherein an outer surface of said mandrel is formed to seat said resistive element and inhibit movement thereof.

35. The resistance temperature detector of claim 33 further comprising bores for receiving said first lead and said second lead.

* * * * *

UNITED STATES PATENT AND TRADEMARK OFFICE
CERTIFICATE OF CORRECTION

PATENT NO.        : 9,103,731 B2
APPLICATION NO.   : 13/590125
DATED             : August 11, 2015
INVENTOR(S)       : DeFrietas et al.

It is certified that error appears in the above-identified patent and that said Letters Patent is hereby corrected as shown below:

In the specification,

In Column 7, Line 11, delete "too" and insert -- to --, therefor.

In Column 8, Line 27, delete "and 756." and insert -- 756. --, therefor.

In the claims,

In Column 10, Line 1, in Claim 3, delete "element" and insert -- detector --, therefor.

Signed and Sealed this
Twenty-second Day of March, 2016

Michelle K. Lee
*Director of the United States Patent and Trademark Office*